United States Patent
Wang et al.

(10) Patent No.: US 11,740,909 B2
(45) Date of Patent: Aug. 29, 2023

(54) SECURE SPECULATIVE EXECUTION OF INSTRUCTIONS

(71) Applicant: Meta Platforms, Inc., Menlo Park, CA (US)

(72) Inventors: Hao Wang, Fremont, CA (US); Harish Dattatraya Dixit, Mountain View, CA (US); Shobhit O. Kanaujia, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/522,722

(22) Filed: Nov. 9, 2021

(65) Prior Publication Data

US 2023/0141935 A1     May 11, 2023

(51) Int. Cl.
*G06F 9/38* (2018.01)
*G06F 21/62* (2013.01)
*G06F 9/30* (2018.01)

(52) U.S. Cl.
CPC ........ *G06F 9/3842* (2013.01); *G06F 9/30043* (2013.01); *G06F 9/30145* (2013.01); *G06F 21/6209* (2013.01)

(58) Field of Classification Search
CPC ............. G06F 9/30043; G06F 9/30145; G06F 9/3842; G06F 21/6209
See application file for complete search history.

(56) References Cited

U.S. PATENT DOCUMENTS

| | | |
|---|---|---|
| 8,117,521 B2 | 2/2012 | Parker et al. |
| 8,677,211 B2 | 3/2014 | Bandholz |
| 2002/0116584 A1 * | 8/2002 | Wilkerson ............ G06F 12/126 712/E9.05 |
| 2011/0161783 A1 * | 6/2011 | Somasekhar ....... G06F 11/1064 711/E12.078 |
| 2019/0004961 A1 | 1/2019 | Boggs et al. |
| 2019/0050230 A1 | 2/2019 | Branco et al. |
| 2020/0065112 A1 | 2/2020 | Gotze |

(Continued)

FOREIGN PATENT DOCUMENTS

WO     2020144446     7/2020

OTHER PUBLICATIONS

Gharachorloo K., et al., "Efficient ECC-Based Directory Implementations for Scalable Multiprocessors," Presented at the 12th Symposium on Computer Architecture and High-Performance Computing, Oct. 2000, 8 pages.

(Continued)

*Primary Examiner* — Zachary K Huson
(74) *Attorney, Agent, or Firm* — Van Pelt, Yi & James LLP

(57) ABSTRACT

A system including a computer storage and a processor is described. The computer storage is configured to identify a stored data as protected. The processor is configured to perform speculative execution. To perform the speculative execution, the processor is configured to determine, in response to the speculative execution of an instruction to read the stored data, whether the stored data is identified as protected. In response to a determination that the stored data attempted to be read during the speculative execution is protected, the processor is configured to disallow during the speculative execution immediate successful completion of the instruction to read the stored data.

20 Claims, 3 Drawing Sheets

(56) References Cited

U.S. PATENT DOCUMENTS

2020/0272474 A1   8/2020   Gabor et al.
2020/0409868 A1  12/2020   Durham
2020/0410094 A1  12/2020   Liu et al.

OTHER PUBLICATIONS

Li P., et al., "Conditional Speculation: An Effective Approach to Safeguard Out-of-Order Execution Against Spectre Attacks," 2019 IEEE International Symposium on High Performance Computer Architecture (HPCA), 2019, pp. 264-276.
International Search Report and Written Opinion for International Application No. PCT/US2022/048327, dated Feb. 3, 2023, 10 pages.

* cited by examiner

SECURE SPECULATIVE EXECUTION OF INSTRUCTIONS

BACKGROUND

Modern computer systems employ speculative execution to improve the processor efficiency. Speculative execution is used primarily for instructions that include one or more conditions. The sequence of instructions followed depends upon the outcome of the condition. In speculative execution, the processor(s) make an assumption about the outcome of the condition and follow an execution path corresponding to the assumption. For example, the processor(s) may assume that the condition is fulfilled and continue loading and executing instructions as though the condition has been fulfilled. If it is determined at some later time that the condition has been fulfilled, processing continues. In such a case, efficiency has been improved because the processor(s) did not wait for the determination that the condition was fulfilled before continuing processing. If it is determined at some time later that the condition has not been fulfilled, then the processor(s) discard the instructions that have been loaded and the corresponding data and reverse any logical state changes for that sequence of instructions. The processor(s) then return to the logical state prior to speculative execution. Then, the processor(s) load instructions corresponding to the condition not being fulfilled, executes these instructions, and continues operation.

Although speculative execution can improve processor efficiency, it also leaves the computer system subject to attack. When using speculative execution, a processor may perform an illegal operation if the assumption made about the condition is incorrect. For example, the processor may speculatively read protected data (e.g. data desired to be kept secret and that may have some security associated with it) from a memory location, which is not supposed to be accessed by the running program. Although the attacker might not be able to read the protected out directly (i.e. the processor could only access the protected data temporarily while it is speculatively executing the wrong path) the attacking program could change other physical state of the processor based on the contents of the memory location. This change in physical state could be measured and therefore may provide information about the protected data. Thus, an attacker may exfiltrate protected data using speculative execution. Security of the protected data may be compromised.

BRIEF DESCRIPTION OF THE DRAWINGS

Various embodiments are disclosed in the following detailed description and the accompanying drawings.

DETAILED DESCRIPTION

Figure 1:
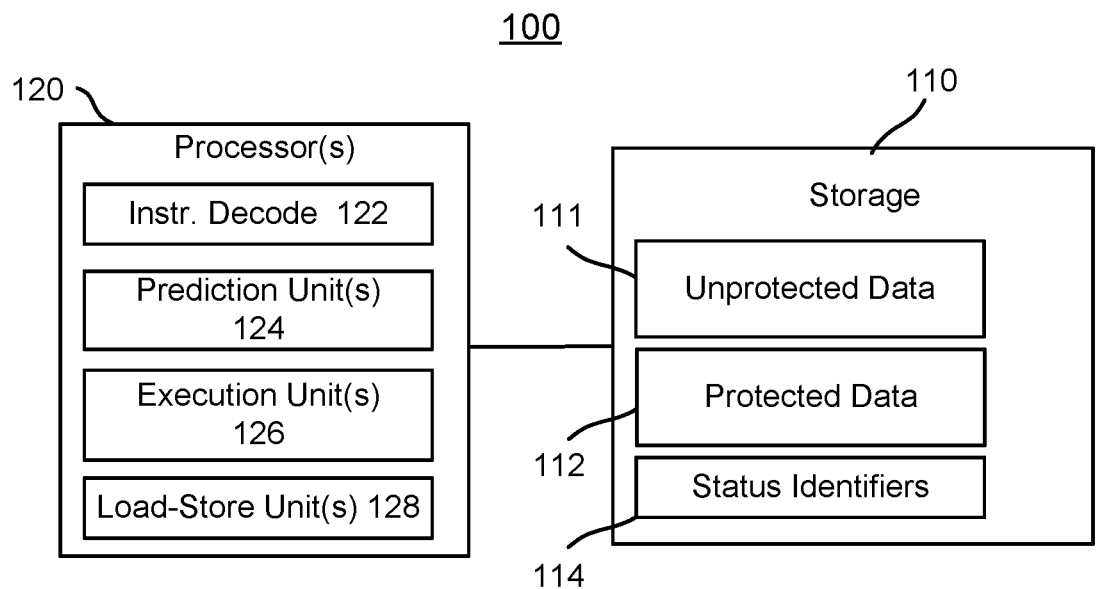
FIG. 1 is a diagram depicting an embodiment of a system capable of performing secure speculative execution of instructions.

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Computer systems may use speculative execution to improve their efficiency when executing instructions that include one or more conditions. In speculative execution, the processor(s) make an assumption about the outcome of the condition and follow an execution path corresponding to the assumption. When the outcome of the condition becomes known, if the assumption is correct, processing continues. In such a case, efficiency has been improved. If it is determined that the assumption is incorrect, then the processor(s) squash the instructions, discard corresponding data, and reverse state changes for that sequence of instructions. The processor(s) then return to the state prior to speculative execution and follow an execution path for the actual outcome of the condition.

Although speculative execution can improve processor efficiency, it also makes the computer system vulnerable. When using speculative execution, a processor may perform an illegal operation if the assumption made about the condition is incorrect. For example, the processor may speculatively read protected data (e.g. data desired to be kept secret and that may have security associated with it). Thus, an attacker may obtain information related to the protected data or the protected data itself. Security of the protected data may be compromised. Accordingly, a mechanism for improving the security of computer systems utilizing speculative execution is desired.

A system including computer storage and a processor is described. The computer storage is configured to identify certain stored data as protected. The processor is also configured to perform speculative execution. When performing speculative execution and in response to the speculative execution of an instruction to read the stored data, the processor determines whether the stored data is identified as protected. In response to a determination that the stored data attempted to be read during the speculative execution is protected, the processor disallows, during the speculative execution, immediate successful completion of the instruction to read the stored data. For example, the speculative execution may be performed for particular instruction(s) that include one or more conditions. In such embodiments, the processor disallows the read instruction during the speculative execution by stalling the execution of the read instruction until the condition(s) being determined to match assumption(s) for speculative execution. In some embodiments, the processor is configured execute a special store instruction for storing sensitive data. The special store instruction marks the sensitive data as protected.

In some embodiments, the stored data is identified as protected by a tag in the computer storage. In such embodiments, the processor is configured to determine whether the stored data is protected by determining a state of the tag. The computer storage may include data storage and error correction code storage corresponding to the data storage. The stored data is stored in the data storage. The protection status is stored in the error correction storage for the stored data being identified as protected. For example, the error correction storage may include tag storage, which includes a tag indicating the stored data is protected for the stored data being identified as protected.

A method is also described and computer program product including instructions for performing the method. The method includes determining, in response to a speculative execution of an instruction to read a stored data, whether the stored data is identified as protected by computer storage in which the stored data is stored. In response to a determination that the stored data attempted to be read during the speculative execution is protected, the method disallows immediate successful completion of the instruction to read the stored data. In some embodiments, the speculative execution may be performed for particular instruction(s) that include one or more conditions. In such embodiments, to disallow during the speculative execution, execution of the read instruction is stalled until the condition(s) being determined to match assumption(s) for speculative execution. In case the assumption(s) is incorrect, the read instruction would be squashed. In some embodiments, a special store instruction is executed for storing sensitive data. The special store instruction identifies the sensitive data as protected.

In some embodiments, the stored data is identified as protected by a tag in the computer storage. In such embodiments, determining whether the stored data is protected includes determining a state of the tag. The computer storage may include data storage and error correction code storage corresponding to the data storage. Actual error correction code may not use all of its storage space. The stored data is stored in the data storage. A protection status is stored in the error correction storage for the stored data that is identified as protected. For example, the error correction storage may include tag storage, which includes a tag indicating the stored data is protected for the stored data being identified as protected. A computer program product embodied in a non-transitory computer readable medium and comprising computer instructions used in carrying out the method is also described.

FIG. 1 is a diagram depicting an embodiment of system 100 capable of performing secure speculative execution of instructions. For simplicity, only some components are shown. System 100 includes storage 110 and one or more processors 120. Processor(s) 120 perform speculative execution. Processor(s) 120 include instruction decode unit(s) 122, prediction unit(s) 124, execution unit(s) 126, and load-store unit(s) 128. However, processor(s) 120 may include additional, different, and/or other components and/or may have a different architecture. In some embodiments, a particular processor includes at least one of each of the units 122, 124, 126, and 128. Instruction decode unit(s) 122 decode instructions for execution. Prediction unit(s) 124 are used to perform speculation and initiate speculative execution. Thus, prediction unit 124 may assume an outcome for each condition of an instruction (i.e. makes the assumption or prediction) to allow processor(s) 120 to operate on the corresponding execution path. Execution unit(s) 126 execute the computer instructions decoded by instruction decode unit 122. Load-store unit(s) 128 may be utilized to load and store data. For example, load-store unit(s) 128 may store data in storage 110 such that data for which security is desired (e.g. data which is desired to be kept secret) is identified. Load-store unit(s) 128 may load data in storage 110, may check the security status tag, and disallow (e.g. stall) the data read during speculative execution if security is desired.

Storage 110 may be one or multiple tiers of memory, which is typically random access memory (RAM), or other type of storage medium. Storage 110 includes unprotected data 111, protected data 112, and status identifiers 114. Unprotected data 111 and protected data 112 may be stored at one or more memory locations of storage 110. Unprotected data 111 includes data that need not be protected from security vulnerabilities during speculative execution. Protected data 112 includes data that has been identified as being desired to be kept secret and for which security during speculative execution is desired. Status identifiers 114 store an indication of whether the data in storage 110 is protected (e.g. secret and desired to be kept secure). Thus, status identifiers 114 indicate that protected data 112 has protected status. In some embodiments, status identifiers 114 may include tags that identify protected data 112.

Figure 2:
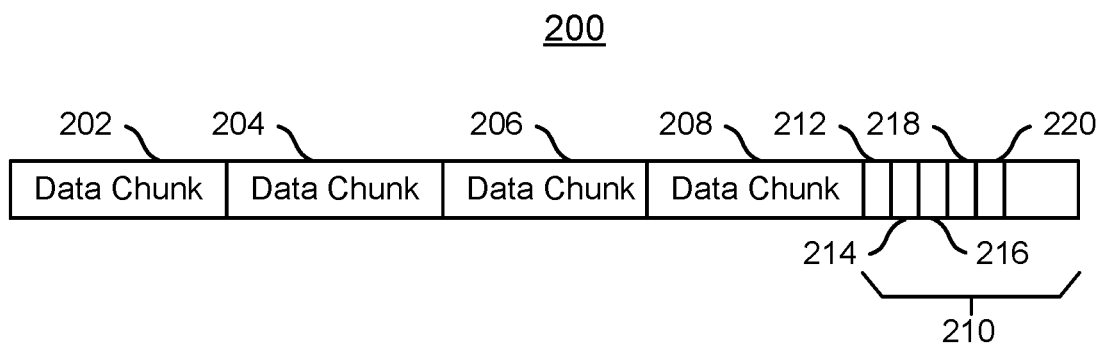
FIG. 2 is a diagram depicting an embodiment of a portion of a system for performing secure speculative execution of instructions.

For example, FIG. 2 is a diagram depicting an embodiment of a portion of memory 200 for performing secure speculative execution of instructions. More specifically, memory 200 may be part of storage 110. For example, storage 110 may include numerous sets of memory 200. Memory 200 includes data chunks 202, 204, 206, and 208 that store data. Also shown are error correction and checking (ECC) bits 210 corresponding to data chunks 202, 204, 206, and 208. As an example for a particular memory technology and ECC implementation, data chunks 202, 204, 206, and 208 may each be a sixty-four bit chunk of data. In such an embodiment, eight bits are used for single error correction, double error detection (SECDED) of each chunk. Thus, ECC bits 210 include sixty-four bits. Bits 212, 214, 216, and 218 each include eight ECC bits for data chunks 202, 204, 206, and 208, respectively. Thus, there are thirty-two bits allocated for error correction of data chunks 202, 204, 206, and 208. ECC bits 210 thus include thirty-two spare bits. These spare bits may be used to identify whether data chunks 202, 204, 206, and 208 include protected data. Tag bits 220 may include eight bits (two bits per chunk 202, 204, 206, and 208) of tags that identify whether the corresponding chunk 202, 204, 206, and/or 208 include protected data. In another embodiment, data chunks 202, 204, 206, and 208 may each include one hundred and twenty-eight bits. ECC bits 210 may then utilize thirty-six bits (nine bits per data chunk) for SECDED error correction of data chunks 202, 204, 206, and 208, respectively. In such an embodiment, twenty-eight spare bits remain for use in identifying whether data chunks 202, 204, 206, and 208 include protected data. Tag bits 220 may include eight bits (two bits per chunk 202, 204, 206, and 208) of tags that identify whether the corresponding chunk 202, 204, 206, and/or 208 include protected data. Thus, data chunks 202, 204, 206, and 208 may be used for protected data 112 and/or unprotected data 111. ECC bits 210 includes error correction bits 212, 213, 216, and 218 as well as tag bits 220 for indicating which data chunks include protected data 112. In the embodiment shown, tag bits 220 do not consume all of the spare bits. Consequently, ECC bits 210 include additional spare bits.

In operation, computer system 100 stores protected data 112. In some embodiments, this is accomplished using load-store unit(s) 128. Processor(s) 120 and/or load-store unit(s) 128 may utilize a specialized store instruction for protected data 112. The specialized store instruction performed by load-store unit(s) 128 provides status identifiers 114 that identify protected data. For example, for some portion of protected data 112 being stored in data chunk 202, the specialized store instruction performed via load-store unit 128 may set the corresponding tag bits 220. For some portion of unprotected data 111 stored in data chunk 208, tag bits 220 are not set and a regular store instruction may be executed.

Processor(s) 120 also perform speculative execution, initiated by prediction unit 124. To do so, processor(s) 120 assume outcomes for conditions of conditional instructions. During speculative execution, processor(s) 120 disallows immediate successful completion of the instruction(s) that read protected data 112. In some embodiments, processor(s) 120 allow immediate successful completion of the instruction(s) that read unprotected data 111 during speculative execution. For example, conditional instruction(s) may include one or more conditions. In such embodiments, processor(s) 120 completes execution of instruction(s) to read protected data 112 in response (e.g. only in response) to the outcome(s) of the condition(s) matching the assumption(s). To do so, processor 120 may check tag bits 220 in response to an instruction to read one or more of data chunks 202, 204, 206, and/or 208. If the tag bits are set to identify the data in one or more of data chunks 202, 204, 206, and/or 208 as protected, the read instruction(s) for these data chunks is temporarily disallowed. In some embodiments, the read instruction is paused until the outcome of the condition in the conditional instruction is known. If the outcome is as assumed, processor 120 performs the read instruction. If the outcome is not as assumed, then the read instruction and other instructions on the incorrect execution path are discarded. Processor 120 returns to the state corresponding to a different (now known) outcome the conditional instruction.

Computer system 100 may have improved efficiency while maintaining security of stored data. Processor(s) 120 may perform speculative execution. Thus, processor(s) 120 need not wait for the outcomes of all conditions for conditional instructions in order to proceed along an execution path. Thus, efficiency of computer system 100 may be improved. Further, because reading of protected data 112 is disallowed during speculative execution, security may be enhanced. Instead, protected data 112 may be read once the outcomes of conditions have been determined to match the assumptions made during speculative execution. Thus, illegal operation(s) that might otherwise be performed as part of speculative execution may be prevented. Thus, security for protected data 112 is enhanced. Use of spare bits in ECC bits 210 may also be transparent to the operating system of computer system 100. Thus, system memory need not be allocated to tags used in identifying protected data and processor(s) 120 need not utilized resources to manage a tag table. Thus, performance of system 100 may not be adversely impacted by the improvement in security.

Figure 3:
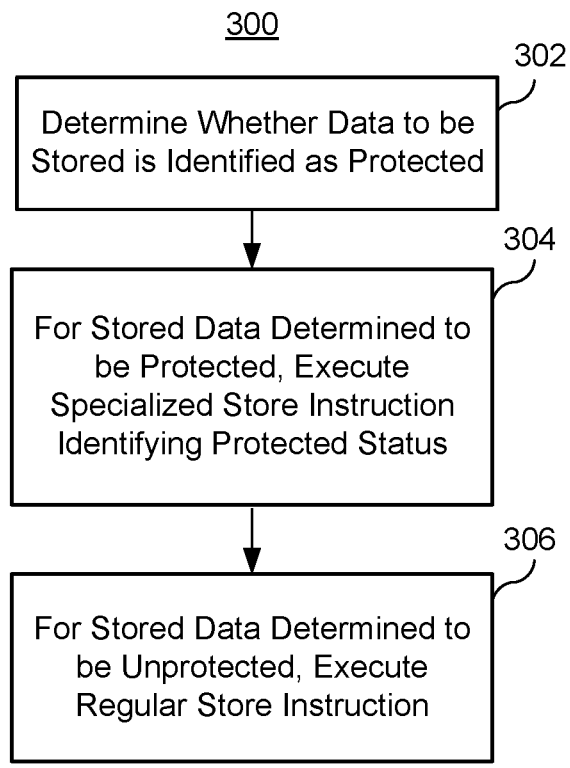
FIG. 3 is a flow-chart depicting an embodiment of a method for storing data that may be secure during speculative execution of instructions.

FIG. 3 is a flow-chart depicting an embodiment of method 300 for storing data that may be secure during speculative execution of instructions. Method 300 is described in the context of system 100 and memory 200. In some embodiments, method 300 may be performed by other systems having other configurations.

It is determined whether data to be stored is desired to be protected during speculative execution, at 302. In some embodiments, 302 includes the data desired to be protected as secret being marked, for example using a pragma in programming language and corresponding compiler support.

For data identified as being desired to remain secret during speculative execution (e.g. protected data) at 302, a specialized store instruction is used, at 304. The specialized store instruction identifies the protected status for the data being stored. Execution of the specialized store instruction not only stores the data at the desired location in storage but also causes status identifiers for the stored data to be set to identify the data as protected. For example, a tag in the corresponding ECC bits may be set to a "1".

For data that need not be protected during speculative execution, a regular store instruction may be executed, at 306. Execution of the regular store instruction not only stores the data at the desired location in storage but does not cause status identifiers for the stored data to be set to identify the data as protected. For example, a tag in the corresponding ECC bits may be set to a "0". Alternatively, the tag in the corresponding ECC bits may be initialized to a "0" and simply not be set to a "1" at 306.

For example, suppose the password in a username/password combination is desired to be protected during speculative execution. A portion of the corresponding code in high-level programming language might include:

```
string username = readUsernameFromInput( );
#pragma tag secret password
string password = readPasswordFromInput( );
bool is_correct = verifyPassword(username, password)
if (! Is_correct)
    Log("incorrect password"); ...
```

In the above example, the username and password are read from the input provided by the user. The password is desired to be identified as protected (e.g. #pragma tag secret password). However, username is not considered protected. The corresponding storage of the username (not protected) and password (protected) may include:

```
//store username in memory: regular store
mov[addr1], username
//store password in memory: special store writes tag= 1
mov_s[addr1], password
```

In the above example, the username is stored using regular store instruction mov. When executing the regular store instruction, processor 120 may store the username with unprotected data 111. If the username is stored in data chunk 202, then the tag in tag bits 220 that corresponds to data chunk 202 may not be set (or may be set to 0). The password is stored using specialized store instructions mov_s. When executing the specialized store instruction, processor 120 may store the username with protected data 112. If the password is stored in data chunk 206, then the tag in tag bits 220 corresponding to data chunk 206 may be set to "1". The specialized instruction thus stores the desired data such that the data is protected during speculative execution. As a result, security and efficiency may be improved.

Figure 4:
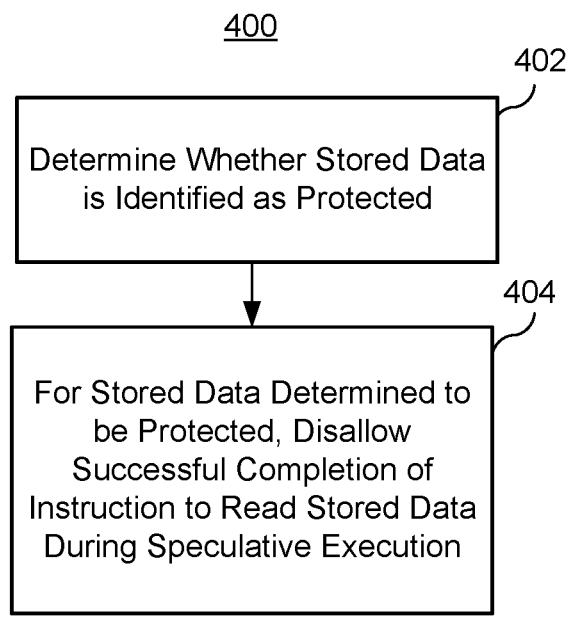
FIG. 4 is a flow-chart depicting an embodiment of a method for securely performing speculative execution of instructions.

FIG. 4 is a flow-chart depicting an embodiment of method 400 for securely performing speculative execution of instructions. Method 400 is described in the context of system 100 and memory 200. In some embodiments, method 400 may be performed by other systems having other configurations. In some embodiments, process 400 is performed during speculative execution. For example, an instruction that has a condition that is not yet resolved may have been loaded. Speculative execution of subsequent instructions is being performed based on an assumption about an outcome of the condition (e.g. it may be assumed that the condition is fulfilled or that the condition is not fulfilled).

In response to speculative execution of an instruction to read a previously stored data, it is determined whether the stored data is identified as protected, at 402. In response to a determination that the stored data attempted to be read during the speculative execution is protected, immediate successful completion of the instruction to read the stored data is disallowed, at 404. Thus, the protected data is not immediately read during speculative execution. In some embodiments, to perform 404, the processor waits to execute the instruction(s) to read the data until the condition causing speculative execution has been resolved. If the condition is resolved such that the protected data is still to be read, then the instruction to read the data is executed. Thus, the protected data is read and may be used by the computer system. If the condition is resolved such that the protected data is no longer to be read, then the read instruction itself is squashed.

For example, in system 100, processor(s) 120 may query status identifiers 114 (e.g. tag bits 220 for data chunk(s) 202, 204, 206, and/or 208) for data being read, at 402. If the status identifiers 114 indicate that the data being read is protected (e.g. one or more of corresponding tag bits 220 set to "1"), then the read is not completed during speculative execution. In some embodiments, processor 120 suspends execution of the read operation until the condition is resolved. Based on how the condition is resolved, processor 120 may complete execution of the read instruction or squash the read instruction. Thus, using method 400, security and efficiency of a computer system may be improved.

Figure 5:
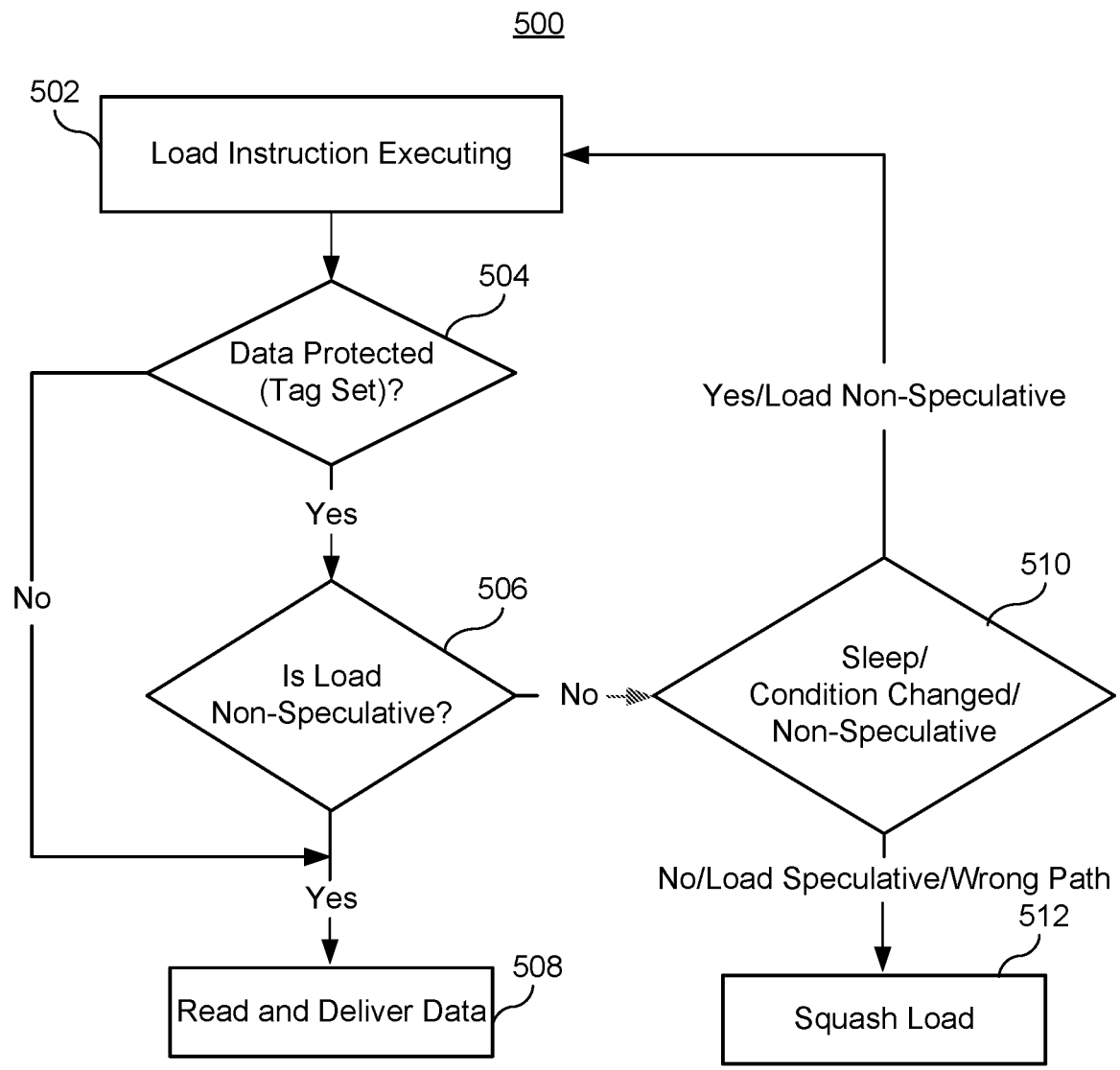
FIG. 5 is a flow-chart depicting an embodiment of a method for securely performing speculative execution of instructions.

FIG. 5 is a flow-chart depicting an embodiment of method 500 for securely performing speculative execution of load instructions. Method 500 is described in the context of system 100 and memory 200. In some embodiments, method 500 may be performed by other systems having other configurations.

Execution of a load instruction is commenced, at 502. A load includes reading and delivering data. Thus, speculative execution of such an instruction may otherwise compromise protected data. It is determined at 504 whether the data to be read is protected. For example, may be determined whether a tag residing in the corresponding spare ECC bits has been set to "1". If the data is not protected, then the data is read and delivered, at 508. Thus, the load instruction is executed at 508. If, however, the data is determined to be protected, then it is determined whether load instruction is non-speculative, at 506. An instruction is non-speculative if both speculative execution is not being performed (i.e. conditions for conditional instructions have been resolved) and the instruction is part of the correct execution path. If the load instruction is non-speculative, then at 508 the load instruction is executed. Thus, at 508, the data is read and delivered.

If, however, it is determined at 506 that the load instruction is not non-speculative (i.e. the instruction is being speculatively executed), then execution of the load instruction is delayed, at 510. For example, the processor may put the load instruction into a sleep state until it is determined that the condition causing speculative execution has been resolved. Based on the outcome of the condition, method 500 takes different paths. If it is determined at 510 that the outcome of the condition has been resolved such that the load instruction is to be carried out (e.g. the assumption(s) about the outcome made for speculative execution were correct), then the load instruction becomes non-speculative. Thus, 502 may be returned to. In this case, 504 and 506 indicate that the data are protected and the load instruction is non-speculative. Thus, protected data are read and delivered, at 508. If, however, it is determined at 510 that the condition has been resolved and the speculation was incorrect, then the load instruction is part of the wrong execution path. Thus, the load instruction is squashed, at 512.

For example, processor 120(s) may execute a load instruction at 502. The load instruction may be used to load protected data 112 and/or unprotected data 111. It is determined whether the data desired to be loaded are protected, at 504. At 504, processor 120 may query tag bits 220 for the requested data chunks 202, 204, 206 and/or 208. If the tag bits 220 are not set to "1", then unprotected data 111 is requested. Thus, the data is read and delivered, at 508. If, however, the tag bits 220 are set to "1", then at 506 it is determined whether the load instruction is non-speculative. If the instruction is non-speculative, then the protected data 112 requested is read and delivered, at 508. If the load instruction is speculative (i.e. is not non-speculative), then at 510 processor(s) 120 wait until the condition is resolved. If the condition is resolved such that the load instruction was part of the wrong execution path, then at 512 the load instruction is squashed. If, however, it is determined at 510 that the load instruction is non-speculative and should be executed, then 502 is returned to. Thus, the desired protected data 112 and unprotected data 111 may be read and delivered, at 508.

Thus, using method 500, efficiency of computer system 100 may be improved through speculative execution. In addition, the security for protected data 112 may be enhanced by prevention of immediate speculative execution of read/load instructions. Protected data 112 may only be read and delivered if the load instruction is non-speculative. Thus, the condition(s) for the instruction(s) causing speculative execution have been resolved and the load/read instructions are part of the correct execution path. Further, use of tags in spare ECC bits 210 by method 500 may provide the enhanced security without adversely affecting system performance. Consequently, security and efficiency of a computer system may be enhanced.

Although the foregoing embodiments have been described in some detail for purposes of clarity of understanding, the disclosure is not limited to the details provided.

There are many alternative ways of implementing the disclosure. The disclosed embodiments are illustrative and not restrictive.

What is claimed is:

1. A system, comprising:
a computer storage configured to identify a stored data as protected; and
a processor configured to perform speculative execution by being configured to:
determine, in response to the speculative execution of an instruction to read the stored data, whether the stored data is identified as protected; and
in response to a determination that the stored data attempted to be read during the speculative execution is protected, disallow during the speculative execution immediate successful completion of the instruction to read the stored data such that the stored data is not read during the speculative execution for the speculative execution.

2. The system of claim 1, wherein the stored data is identified as protected by a tag in the computer storage and wherein to determine whether the stored data is protected, the processor is further configured to:
determine a state of the tag.

3. The system of claim 1, wherein to disallow during the speculative execution the immediate successful completion of the instruction, the processor is further configured to:
execute the instruction to read the stored data in response to the instruction becoming non-speculative.

4. The system of claim 1, wherein the processor is further configured to:
execute a special store instruction for storing sensitive data, the special store instruction identifying the sensitive data as protected.

5. The system of claim 1, wherein the computer storage includes data storage and error correction code storage corresponding to the data storage, the stored data being stored in the data storage, and a protection status being stored in the error correction storage for the stored data being identified as protected.

6. The system of claim 5, wherein the error correction storage includes tag storage, the tag storage including a tag indicating the stored data is protected for the stored data being identified as protected.

7. The system of claim 1, wherein the speculative execution is performed for a particular instruction including at least one condition, wherein to perform the speculative execution, the processor is further configured to make at least one assumption of at least one outcome for the at least one condition, and wherein, the processor is further configured to:
complete execution of the instruction in response to the at least one outcome for the at least one condition being determined to match the at least one assumption for the speculative execution such that the particular instruction has become non-speculative.

8. A method, comprising:
determining, in response to a speculative execution of an instruction to read a stored data in a computer storage, whether the stored data is identified as protected by the computer storage; and
in response to a determination that the stored data attempted to be read during the speculative execution is protected, disallowing during the speculative execution immediate successful completion of the instruction to read the stored data such that the stored data is not read during speculative execution for the speculative execution.

9. The method of claim 8, wherein the stored data is identified as protected by a tag in the computer storage and wherein the determining whether the stored data is protected further includes:
determining a state of the tag.

10. The method of claim 8, wherein the disallowing during the speculative execution the immediate successful completion of the instruction further includes:
executing the instruction to read the stored data in response to the instruction becoming non-speculative.

11. The method of claim 8, further comprising:
executing a special store instruction for storing sensitive data, the special store instruction identifying the sensitive data as protected.

12. The method of claim 8, wherein the computer storage includes data storage and error correction code storage corresponding to the data storage, the stored data being stored in the data storage, and a protection status being stored in the error correction storage for the stored data being identified as protected.

13. The method of claim 12, wherein the error correction storage includes tag storage, the tag storage including a tag indicating the stored data is protected for the stored data being identified as protected.

14. The method of claim 8, wherein the speculative execution is performed for a particular instruction including at least one condition, wherein to perform the speculative execution, at least one assumption of at least one outcome for the at least one condition is made, and wherein the method further includes:
completing execution of the instruction in response to the at least one outcome for the at least one condition being determined to match the at least one assumption for the speculative execution such that the particular instruction has become non-speculative.

15. A computer program product embodied in a non-transitory computer readable medium and comprising computer instructions for:
determining, in response to a speculative execution of an instruction to read a stored data in a computer storage, whether the stored data is identified as protected by the computer storage; and
in response to a determination that the stored data attempted to be read during the speculative execution is protected, disallowing during the speculative execution immediate successful completion of the instruction to read the stored data such that the stored data is not read during speculative execution for the speculative execution.

16. The computer program product of claim 15, wherein the stored data is identified as protected by a tag in the computer storage and wherein the computer instructions for determining whether the stored data is protected further include computer instructions for:
determining a state of the tag.

17. The computer program product of claim 15, wherein the computer instructions further include computer instructions for:
executing a special store instruction for storing sensitive data, the special store instruction identifying the sensitive data as protected.

18. The computer program product of claim 15, wherein the computer storage includes data storage and error correction code storage corresponding to the data storage, the stored data being stored in the data storage, and a protection status being stored in the error correction storage for the stored data being identified as protected.

19. The computer program product of claim 18, wherein the error correction storage includes tag storage, the tag storage including a tag indicating the stored data is protected for the stored data being identified as protected.

20. The computer program product of claim 15, wherein the speculative execution is performed for a particular instruction including at least one condition, wherein to perform the speculative execution, at least one assumption of at least one outcome for the at least one condition is made, and wherein the computer instructions further include computer instructions for:

completing execution of the instruction in response to the at least one outcome for the at least one condition being determined to match the at least one assumption for the speculative execution such that the particular instruction has become non-speculative.

\* \* \* \* \*